US009835425B2

(12) United States Patent
Rodriguez et al.

(10) Patent No.: US 9,835,425 B2
(45) Date of Patent: Dec. 5, 2017

(54) METALLIC NOSECONE WITH UNITARY ASSEMBLY

(71) Applicant: Raytheon Company, Waltham, MA (US)

(72) Inventors: Stephanie G. Rodriguez, Tucson, AZ (US); Todd Kuhar, Tucson, AZ (US); Thomas H. Penhollow, Tucson, AZ (US); Brian B. Greer, Tucson, AZ (US); Mark A. Hahn, Tucson, AZ (US); Regina P. Reed, Tucson, AZ (US); Richard M. Cordova, Tucson, AZ (US); Patrick G. Dickerson, Tucson, AZ (US); Kenneth G. Preston, Sahuarita, AZ (US); Rick A. Ramos, Denver, CO (US); Brady A. Hink, Tucson, AZ (US); Gary H. Johnson, Tucson, AZ (US)

(73) Assignee: RAYTHEON COMPANY, Waltham, MA (US)

( * ) Notice: Subject to any disclaimer, the term of this patent is extended or adjusted under 35 U.S.C. 154(b) by 158 days.

(21) Appl. No.: 14/826,668

(22) Filed: Aug. 14, 2015

(65) Prior Publication Data
US 2017/0045344 A1  Feb. 16, 2017

(51) Int. Cl.
*F42B 10/46* (2006.01)
*B64C 30/00* (2006.01)
(Continued)

(52) U.S. Cl.
CPC ............ *F42B 10/46* (2013.01); *B64C 1/0009* (2013.01); *B64C 1/40* (2013.01); *B64C 30/00* (2013.01); *F42B 15/36* (2013.01)

(58) Field of Classification Search
CPC .. B64C 7/00; B64C 1/36; H01Q 1/422; B64D 29/00; B64D 29/06; F42B 10/36
See application file for complete search history.

(56) References Cited

U.S. PATENT DOCUMENTS 3,026,806 A   3/1962  Runton
3,152,548 A   10/1964 Schwartz
(Continued)

FOREIGN PATENT DOCUMENTS

DE   3243823 A1   5/1984
DE   EP 2960987 A1 * 12/2015 ........... H01Q 15/141
(Continued)

OTHER PUBLICATIONS

ISR/WO, dated Aug. 25, 2016, RAY0313PCT, PCT Application No. PCTUS2016031153.
(Continued)

*Primary Examiner* — Benjamin P Lee
(74) *Attorney, Agent, or Firm* — Cantor Colburn LLP

(57) ABSTRACT

A nosecone is provided and includes a ring that includes an angled surface, a nosecone tip, a double-walled shroud portion including inner and outer dome elements, a first end that interfaces with and is constrained by the nosecone tip and a second end that is connectable to the ring to define with the angled surface a sliding, resistive interface and a shim disposable in the double walled shroud portion to pre-load the sliding, resistive interface and to provide for separation distance between the inner and outer dome elements.

20 Claims, 5 Drawing Sheets

(51) Int. Cl.
*B64C 1/40* (2006.01)
*B64C 1/00* (2006.01)
*F42B 15/36* (2006.01)

(56) References Cited

U.S. PATENT DOCUMENTS

| | | | |
|---|---|---|---|
| 3,255,698 A | 6/1966 | Lindberg | |
| 3,545,146 A * | 12/1970 | Kerr | B64C 1/36 343/872 |
| 3,925,783 A * | 12/1975 | Bleday | H01Q 1/422 343/705 |
| 4,520,364 A * | 5/1985 | Perry | H01Q 1/28 343/872 |
| 4,677,443 A * | 6/1987 | Koetje | H01Q 1/422 343/872 |
| 5,291,830 A * | 3/1994 | Zwan | B64C 1/38 102/293 |
| 5,340,058 A | 8/1994 | Holl | |
| 5,691,736 A * | 11/1997 | Hunn | H01Q 1/425 244/121 |
| 5,820,077 A * | 10/1998 | Sutliff | B64C 1/36 244/119 |
| 5,884,864 A * | 3/1999 | Sunne | H01Q 1/28 244/121 |
| 6,094,054 A * | 7/2000 | Crist | F42B 30/006 102/211 |
| 6,107,976 A * | 8/2000 | Purinton | H01Q 1/42 343/872 |
| 6,157,349 A * | 12/2000 | Crouch | H01Q 1/42 343/872 |
| 6,918,985 B2 * | 7/2005 | Geyer | B29C 70/086 156/245 |
| 6,992,640 B2 * | 1/2006 | Usami | H01Q 1/28 343/705 |
| 7,242,365 B1 * | 7/2007 | Boatman | H01Q 1/42 343/872 |
| 7,681,834 B2 | 3/2010 | Facciano | |
| 8,058,595 B2 | 11/2011 | Koehler | |
| 8,130,167 B2 * | 3/2012 | Glabe | H01Q 1/42 343/705 |
| 9,548,531 B2 * | 1/2017 | Schoenlinner | H01Q 15/141 |
| 2005/0214067 A1 * | 9/2005 | Cherian | B64G 1/58 403/220 |
| 2009/0096687 A1 | 4/2009 | Gentilman et al. | |
| 2009/0314890 A1 * | 12/2009 | Koehler | B64C 1/36 244/119 |
| 2012/0176294 A1 * | 7/2012 | Kviatkofsky | F42B 10/46 343/872 |
| 2012/0212391 A1 * | 8/2012 | Dazet | B64C 1/36 343/872 |
| 2013/0280470 A1 * | 10/2013 | Norly | F42B 10/46 428/76 |
| 2014/0255202 A1 | 9/2014 | Kling | |

FOREIGN PATENT DOCUMENTS

| | | | | |
|---|---|---|---|---|
| NL | WO 2013037811 A1 * | 3/2013 | | B29C 70/04 |
| WO | 2014039122 A2 | 3/2014 | | |

OTHER PUBLICATIONS

H.J. Hoffman, "Assessment of and Recommendations Concerning Standard Missile-3 (SM-3) Nosecone Cracks", Sep. 28, 2011, 50 pages.

* cited by examiner

SEPARATION DISTANCE BETWEEN INNER AND OUTER
DOME ELEMENTS 20 AND 30 PROVIDED BY SHIM 13

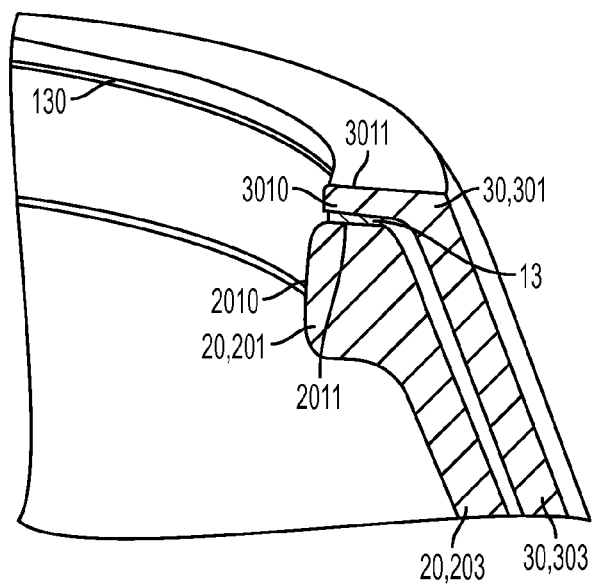
FIG. 6
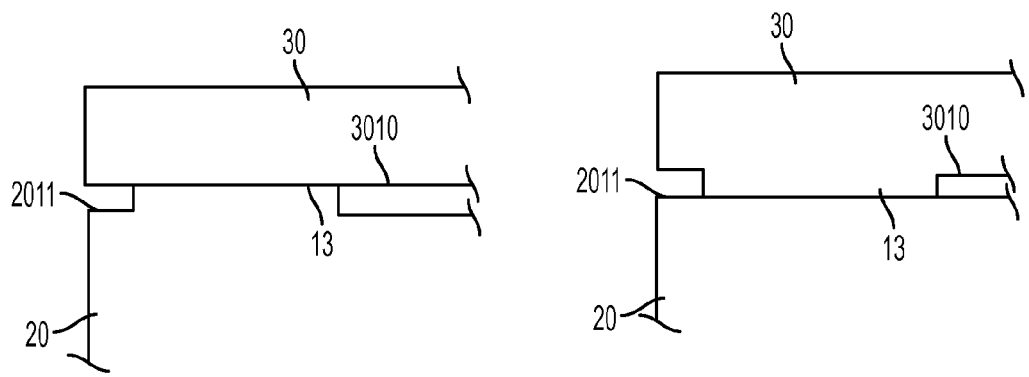
FIG. 7A
FIG. 7B

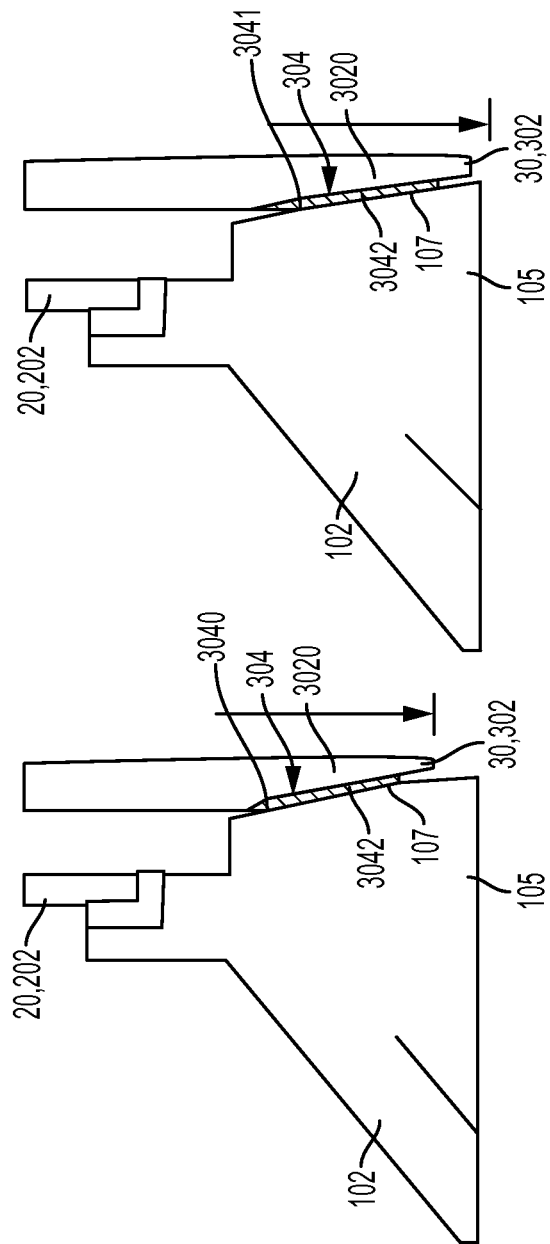

METALLIC NOSECONE WITH UNITARY ASSEMBLY

BACKGROUND

The present disclosure relates to a nosecone of a missile or another similar device and, more particularly, to a high-performance (i.e., supersonic or hypersonic), adaptable metallic nosecone with a unitary assembly.

Nosecones and radomes on missile or other aircraft programs are typically formed with composite designs and are made of exotic materials. The composite designs are often characterized as being complex with multiple components on critical interfaces and are generally not optimized for thermal performance even on exterior surfaces. For example, in a clamshell design, multiple parts are required for the nosecone ejection system. The exotic materials often include composites that are highly dependent on manufacturing processes for repeatability. Unless testing is performed often, however, material properties of these composites may shift throughout production periods and performance lifetimes. Moreover, exotic materials and composites are often relatively costly with longer lead times than metallic materials.

SUMMARY

According to one embodiment, a nosecone is provided and includes a ring including an angled surface, a nosecone tip, a double-walled shroud portion including inner and outer dome elements, a first end that interfaces with and is constrained by the nosecone tip and a second end that is connectable to the ring to define with the angled surface a sliding, resistive interface and a shim disposable in the double walled shroud portion to pre-load the sliding, resistive interface and to provide for separation distance between the inner and outer dome elements.

According to another embodiment, a nosecone is provided and includes a ring including an angled surface, a nosecone tip including first and second transverse surfaces, inner and outer dome elements and a shim. The inner dome element includes a first end to interface with the first surface of the nosecone tip and a second end connectable to the ring. The outer dome element is disposable about the inner dome element and includes a first end to be constrained by the second surface of the nosecone tip and a second end formed to define with the angled surface a sliding, resistive interface. The shim is disposable between the respective first ends of the inner and outer dome elements to pre-load the sliding, resistive interface and to provide for separation distance between the inner and outer dome elements.

According to another embodiment, a ballistic missile or rocket powered aircraft is provided and includes a fuselage and a nosecone configured for ejection from the fuselage. The nosecone includes a ring that in turn includes an angled surface and is attachable to and partially detachable from the fuselage, a nosecone tip including first and second transverse surfaces, inner and outer dome elements and a shim. The inner dome element includes a first end to interface with the first surface of the nosecone tip and a second end connectable to the ring. The outer dome element is disposable about the inner dome element and includes a first end to be constrained by the second surface of the nosecone tip and a second end formed to define with the angled surface a sliding, resistive interface. The shim is disposable between the respective first ends of the inner and outer dome elements to pre-load the sliding, resistive interface and to provide for separation distance between the inner and outer dome elements.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

For a more complete understanding of this disclosure, reference is now made to the following brief description, taken in connection with the accompanying drawings and detailed description, wherein like reference numerals represent like parts:

FIG. 6 is an enlarged perspective cutaway view of a shim of the nosecone of FIG. 2;

FIG. 7A is a schematic side view of the shim of FIG. 6 in accordance with alternative embodiments;

FIG. 7B is a schematic side view of the shim of FIG. 6 in accordance with alternative embodiments;

FIG. 8A is an enlarged side view of a sliding, resistive interface of the nosecone of FIG. 2 at an initial condition; and FIG. 8B is an enlarged side view of the sliding, resistive interface of FIG. 8A at a secondary condition.

DETAILED DESCRIPTION

As will be described below, a nosecone is provided and utilizes one metal (e.g., Titanium-6Al-4V) for thermal protection and structural support. The use of titanium or titanium alloy alloy provides the nosecone with consistent and well defined properties and the configuration of the nosecone utilizes simple geometric interfaces and modular designs for major components leading to reduced cost for manufacturing and assembly. The reduced number of parts of the nosecone as compared to conventional designs permits optimization for thermal performance.

Figure 1:
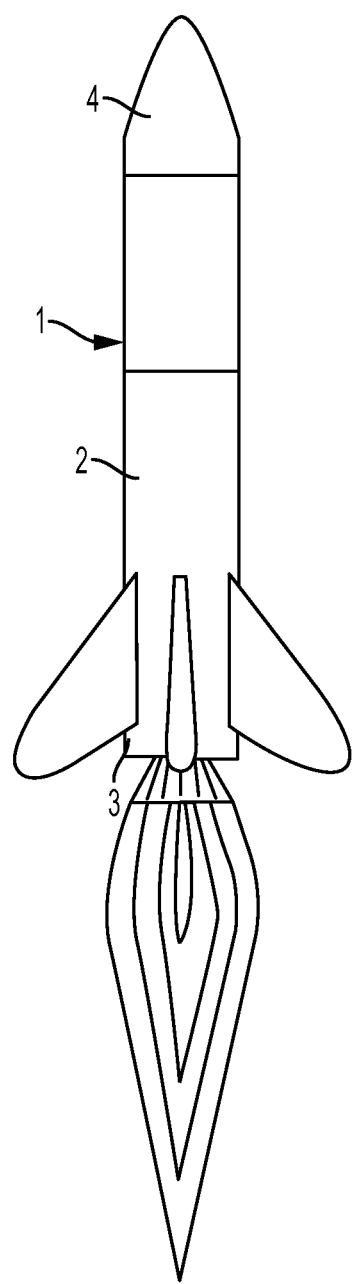
FIG. 1 is an elevation view of a ballistic missile or rocket propelled aircraft in accordance with embodiments.

With reference to FIG. 1, a ballistic missile or rocket powered aircraft 1, such as a missile, is provided. The aircraft 1 includes a fuselage 2, which may be provided as a tubular body, a thrust generating section 3 at an aft end of the fuselage 2 and a nosecone 4 at a forward end of the fuselage 2. During certain operations of the aircraft 1 in which thrust generated by the thrust generating section 3 is substantial, the aircraft 1 is propelled forwardly at high speeds and thus the nosecone 4 is configured to withstand thermally stressing conditions and aerodynamic loads associated with high-speed flight. During other operations of the aircraft, the nosecone 4 is ejected from the fuselage 2 and is thus configured to also withstand thermally stressing conditions and aerodynamic loads associated with ejection.

Figure 2:
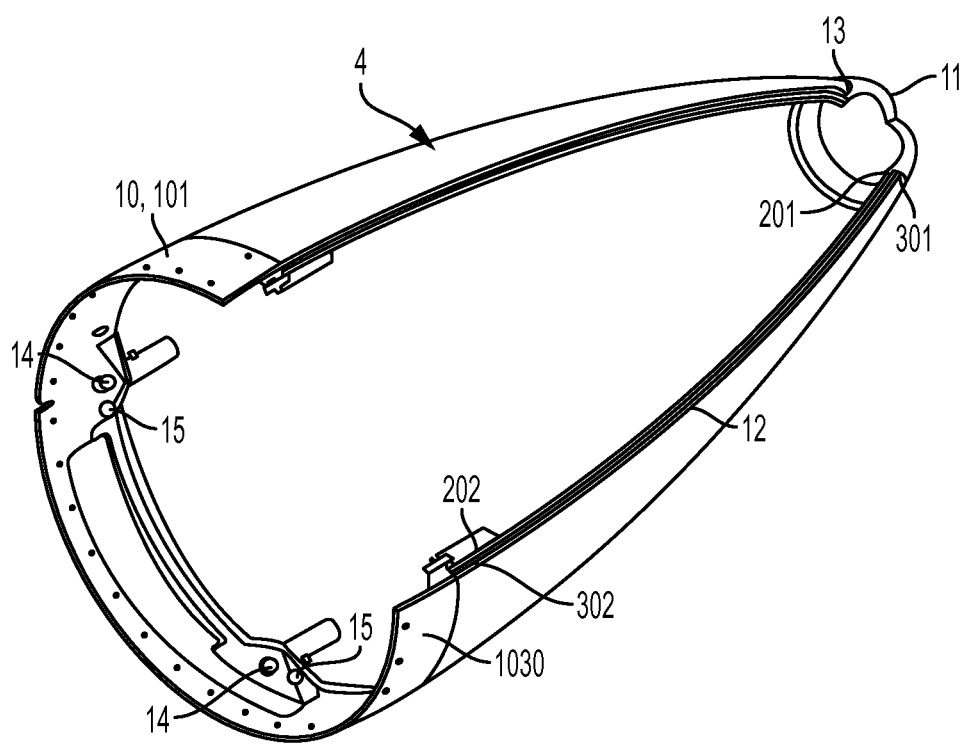
FIG. 2 is a perspective cutaway view of a nosecone of the aircraft of FIG. 1.
Figure 3:
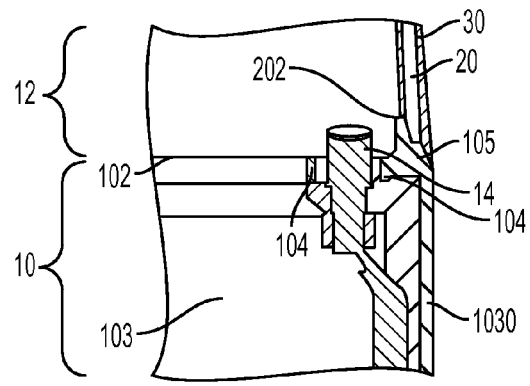
FIG. 3 is an enlarged side view of a ring of the nosecone of FIG. 2.
Figure 4:
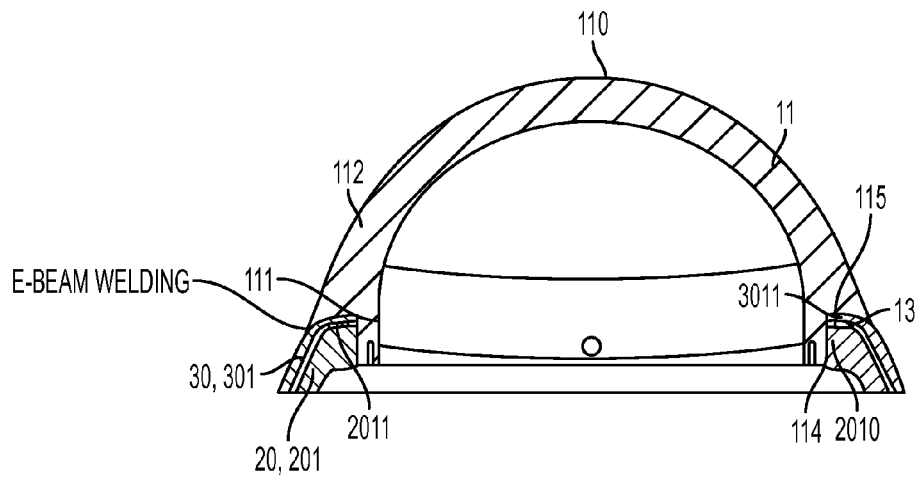
FIG. 4 is an enlarged side view of a nosecone tip of the nosecone of FIG. 2.

With reference to FIGS. 1-3, the nosecone 4 is formed of a unitary metallic material, such as titanium, and includes at least a portion of a ring 10, a nosecone tip 11, a double-walled shroud portion 12 that is axially interposed between the ring 10 and the double-walled shroud portion 12 and a shim 13 (see FIGS. 4 and 6). Where the aircraft 1 is a missile with the nosecone 4 being detachable from the fuselage 2, for example, the nosecone tip 11 forms a forward-most end of the aircraft 1, the double-walled shroud portion 12 thermally and aerodynamically protects a payload attached to the fuselage 2 and the detachment is provided for by the ring 10.

The ring 10 may be provided as an annular element 101 that includes an upper anvil portion 102 (see FIG. 3) that may be formed of titanium along with the rest of the nosecone 11 and a lower anvil portion 103 that may be formed of aluminum and from which the upper anvil portion 102 along with the rest of the nosecone 11 is detachable. In this way, the nosecone 4 is effectively provided as a two-part structure having a unitary metallic ejection part, which includes the upper anvil portion 102, the shroud portion 12 and the nosecone tip 11, and a remnant that remains with the fuselage 2 and includes the lower anvil portion 103. At least the lower anvil portion 103 and a lower part of the upper anvil portion 102 may be coated with a thermal protection system (TPS) 1030 formed of, e.g., Acusil II™.

As shown in FIG. 3, detachment is provided for by way of fastening elements 14, which are arrayed about respective interior surfaces of the ring 10 and the double-walled shroud portion 12. The fastening elements 14 may be uniformly separated from one another and may each include housings and connection elements. The housings are secured to the interior surface of the double-walled shroud portion 12 (i.e., an interior facing surface of an inner dome element 20 to be described below). The connection elements extend from the housings through the upper anvil portion 102 to the lower anvil portion 103.

As shown in FIG. 1 and, in accordance with embodiments, the fastening elements 14 may be paired with pressure relief doors 15 as part of a pressure relief system. Such a pressure relief system may generally be configured to maintain an internal absolute pressure of less than a specified value depending on a changing payload gas flow rate and to maintain an external and internal differential pressure for various trajectories taking into account changing internal pressures.

The double-walled shroud portion 12 has a thermally tunable design and includes an inner dome element 20 and an outer dome element 30, which will be described in greater detail below. The upper anvil portion 102 of the ring 10 has an interior, annular portion 104 and a peripheral portion 105 disposed about the interior, annular portion 104. The interior annular portion 104 is connectable with a second end 202 of the inner dome element 20 by way of an aft ring weld 106 (see FIGS. 8A and 8B) and extends axially forwardly from the peripheral portion 105. The peripheral portion 105 includes an annular, angled surface 107 (see FIGS. 8A and 8B), which increases in diameter with increasing distance from the nosecone tip 11. A diameter of the annular, angled surface 107 at its forward-most and narrowest axial location may be equal to or smaller than a diameter of the outer dome element 30 in a condition in which the outer dome element 30 is not pre-loaded.

With reference to FIG. 4, the nosecone tip 11 has a forward portion 110 and an aft portion 111. The forward portion 110 has an exterior surface 112 with a blunt curvature that is configured to be the first component of the aircraft 1 to encounter atmospheric conditions during flight operations. The aft portion 111 includes a first surface 114 and a second surface 115, which is oriented transversely with respect to the first surface 114. More particularly, the first surface 114 may be provided as an annular, radially outwardly facing surface and the second surface 115 may be provided as an annular, axially facing surface.

As shown in FIG. 4, the forward portion 110 may be bonded to the outer dome element 30 by various methods and processes (e.g., the forward portion 110 may be E-beam welded or otherwise bonded to the outer dome element 30 with post assembly machining executed) to form a smooth, continuous outer profile interface that exhibits reduced heating due to surface irregularities that trip turbulent flows. The blunting of the forward portion provides for increased hemispherical radius and reduces aero-thermodynamic heating along an axial length of the nosecone 11. This in turn translates to a capability of using materials for the nosecone 11 with higher material strength values via reduced temperature knock-down factors.

Figure 5:
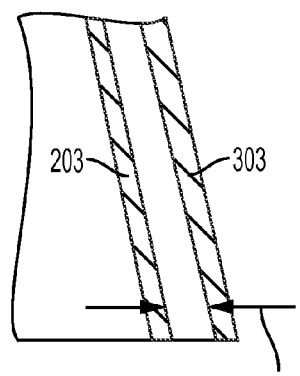
FIG. 5 is an enlarged side view of inner and outer dome elements of the nosecone of FIG. 2.

With the upper anvil portion 102 of the ring 10 and the aft portion 111 of the nosecone tip 11 constructed as described above, the inner dome element 20 and the outer dome element 30 will now be described with continued reference to FIG. 2 and with additional reference to FIG. 5 and in accordance with embodiments.

The inner dome element 20 includes a first end 201, the above-mentioned second end 202 and a wall section 203 that extends from the first end 201 to the second end 202. An interior facing surface of the wall section 203 may be polished to have a relatively low emissivity and an exterior facing surface of the wall section 203 may be nominally emissive although it is to be understood that as a general matter the interior and exterior facing surfaces of the wall section 203 may each have a tailorable emissivity. The first end 201 is configured to interface with the first surface 114 of the nosecone tip 11 by, for example, a threaded engagement, mechanical or frictional interference or bonding, such as welding.

As such, as shown in FIGS. 4 and 6, the first end 201 may be provided as an annular, radially inwardly facing surface 2010, which is disposable to complement the first surface 114, and an annular, axially facing surface 2011, which is disposable to abut with the shim 13. The second end 202 is connectable to the interior annular portion 104 of the upper anvil portion 102 of the ring 10, as shown in FIG. 3 and as noted above.

The outer dome element 30 is disposable about the inner dome element 20 and includes a first end 301, a second end 302 and a wall section 303 that extends from the first end 301 to the second end 302. An interior facing surface of the wall section 303 may be polished to have a relatively low emissivity and an exterior facing surface of the wall section 303 may be relatively highly emissive although it is to be understood that as a general matter the interior and exterior facing surfaces of the wall section 303 may each have a tailorable emissivity. The first end 301 is configured to be constrained by the second surface 115 of the nosecone tip 11 and the second end 302 is formed to define a sliding, resistive interface 304 with the annular, angled surface 107 of the upper anvil portion 102 of the ring 10 (see FIGS. 8A and 8B).

As such, as shown in FIGS. 4, 6 and 8, the first end 301 may include opposing annular, axially facing surfaces 3010, 3011 disposable to abut with the shim 13 and the second surface 115 of the nosecone tip 11, respectively, and the second end 302 may include an annular, angled surface 3020 to complement the annular, angled surface 107.

With reference to FIGS. 6, 7A and 7B, the shim 13 is disposable between the first end 201 of the inner dome element 20 and the first end 301 of the outer dome element 30. More particularly, the shim 13 is disposable between the annular, axially facing surface 2011 of the first end 201 and the annular, axially facing surface 3010 of the first end 301. The shim 13 may include or be provided as an annular ring 130 that has a substantially uniform radial thickness from an interior diameter thereof to an outer diameter thereof and a substantially uniform axial thickness (i.e., between the annular, axially facing surface 2011 of the first end 201 and the annular, axially facing surface 3010 of the first end 301).

In accordance with alternative embodiments, the shim 13 may be integrally formed with the annular, axially facing surface 2011 of the first end 201 of the inner dome element 20 (see FIG. 7A) or with the annular, axially facing surface 3010 of the first end 301 of the outer dome element 30 (see FIG. 7B).

In any case, the shim 13 serves to pre-load the sliding, resistive interface 304 and to provide for separation distance between the inner and outer dome elements 20 and 30. As to the latter point, in accordance with embodiments, the shim 13 may be selectable from a plurality of shims 13 where each shim 13 in the plurality has at least a unique axial thickness. As such, the selection of the shim 13 defines a separation distance between the respective first ends 201, 301 of the inner and outer domes elements 20 and 30 and thus correspondingly defines separation distances between the respective second ends 202, 302 and wall sections 203, 303 of the inner and outer dome elements 20 and 30.

With reference to FIGS. 8A and 8B and, as to the shim 13 serving to pre-load the sliding, resistive interface 304, an interior diameter of the annular, angled surface 3020 may be substantially similar to an exterior diameter of the annular, angled surface 107 at an initial point of contact 3040. Thus, with the first end 301 of the outer dome element 30 constrained by the by the second surface 115 of the nosecone tip 11, the placement of the shim 13 between the annular, axially facing surface 2011 and the annular, axially facing surface 3010 serves to urge the annular, angled surface 3020 against the annular, angled surface 107. Such urging pre-loads the sliding, resistive interface 304 and it is to be understood that an amount of the pre-loading can be adjusted by the selection of various shims 13 with differing axial thicknesses.

In accordance with further embodiments, a clamping tool with a load cell can be used to derive a correct spacing for a particular shim 13 with a particular axial thickness in order to achieve desired pre-load for the sliding, resistive interface 304.

During operation of the nosecone 11, whereby the outer dome element 30 is subject to thermal expansion and contraction at a greater rate than the inner dome element 20 and the ring 10, the utility of the sliding, resistive interface 304 lies in the fact that the second end 302 of the outer dome element 30 thermally expands (or contracts) from the initial point of contact 3040 (see FIG. 8A) to a secondary point of contact 3041 (see FIG. 8B). In so doing, the outer dome element 30 absorbs most of the thermal deformation of the nosecone 11 and permits the inner dome element 20 to remain substantially free of deformation.

In accordance with further embodiments, the sliding, resistive interface 304 may include an elongate, annular contact surface 3042. This elongate, annular contact surface 3042 is formed at an interface of the annular, angled surface 3020 and the annular, angled surface 107 and thus extends from an upper or axially forward-most portion of the initial point of contact 3040 to a lower or axially rearward-most portion of the secondary point of contact 3041. In addition, where the annular, angled surface 107 and the annular, angled surface 3020 have respective curvatures, the curvature of the annular, angled surface 3020 complements the curvature of the annular, angled surface 107 an along an entirety of the elongate, annular contact surface 3042. That is, the curvature of the annular, angled surface 3020 complements the curvature of the annular, angled surface 107 from the upper or axially forward-most portion of the initial point of contact 3040 to the lower or axially rearward-most portion of the secondary point of contact 3041.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

While the preferred embodiments to the invention have been described, it will be understood that those skilled in the art, both now and in the future, may make various improvements and enhancements which fall within the scope of the claims which follow. These claims should be construed to maintain the proper protection for the invention first described.

What is claimed is:

1. A nosecone, comprising:
    a ring including an angled surface;
    a nosecone tip;
    a double-walled shroud portion including inner and outer dome elements, a first end that interfaces with and is constrained by the nosecone tip and a second end that is connectable to the ring to define with the angled surface a sliding, resistive interface; and
    a shim disposable in between the inner and outer dome elements of the double walled shroud portion proximate to the nosecone tip to pre-load the sliding, resistive interface and to provide for separation distance between the inner and outer dome elements.

2. The nosecone according to claim 1, wherein the nosecone tip, the shroud portion and the shim comprise titanium.

3. The nosecone according to claim 1, wherein the angled surface is annular and increases in diameter with increasing distance from the nosecone tip.

4. The nosecone according to claim 1, wherein the nosecone tip comprises a blunt curvature.

5. The nosecone according to claim 1, wherein interior and exterior facing surfaces of the inner and outer dome elements each have a tailorable emissivity.

6. The nosecone according to claim 1, wherein the shim comprises an annular ring having substantially uniform axial and radial thicknesses.

7. A nosecone, comprising:
a ring including an angled surface;
a nosecone tip including first and second transverse surfaces;
an inner dome element including a first end to interface with the first surface of the nosecone tip and a second end connectable to the ring;
an outer dome element disposable about the inner dome element and including a first end to be constrained by the second surface of the nosecone tip and a second end formed to define with the angled surface a sliding, resistive interface; and
a shim disposable between the respective first ends of the inner and outer dome elements to pre-load the sliding, resistive interface and to provide for separation distance between the inner and outer dome elements.

8. The nosecone according to claim 7, wherein the nosecone tip, the inner and outer dome elements and the shim comprise similar metallic materials and the ring comprises aluminum and an exterior thermal protection coating.

9. The nosecone according to claim 7, wherein the nosecone tip, the inner and outer dome elements and the shim comprise titanium.

10. The nosecone according to claim 7, wherein the angled surface is annular and increases in diameter with increasing distance from the nosecone tip.

11. The nosecone according to claim 7, wherein the nosecone tip comprises a blunt curvature.

12. The nosecone according to claim 7, wherein the first surface of the nosecone tip comprises an annular, radially outwardly facing surface and the second surface of the nosecone tip comprises an annular, axially facing surface.

13. The nosecone according to claim 7, wherein:
the first end of the inner dome element comprises an annular, radially inwardly facing surface to complement the first surface of the nosecone tip and an annular, axially facing surface to abut with the shim, and
the first end of the outer dome element comprises opposing annular, axially facing surfaces to abut with the shim and the second surface of the nosecone tip.

14. The nosecone according to claim 7, wherein:
the second end of the inner dome element is configured to be welded to the ring, and
the second end of the outer dome element comprises an annular, angled surface to complement the angled surface of the ring.

15. The nosecone according to claim 7, wherein the shim comprises an annular ring having substantially uniform axial and radial thicknesses.

16. The nosecone according to claim 7, wherein the shim is integrally formed with at least one of the inner and outer dome elements.

17. A ballistic or rocket powered aircraft, comprising:
a fuselage; and
a nosecone configured for ejection from the fuselage, the nosecone comprising:
a ring including an angled surface and being attachable to and partially detachable from the fuselage;
a nosecone tip including first and second transverse surfaces;
an inner dome element including a first end to interface with the first surface of the nosecone tip and a second end connectable to the ring;
an outer dome element disposable about the inner dome element and including a first end to be constrained by the second surface of the nosecone tip and a second end formed to define with the angled surface a sliding, resistive interface; and
a shim disposable between the respective first ends of the inner and outer dome elements to pre-load the sliding, resistive interface and to provide for separation distance between the inner and outer dome elements.

18. The ballistic or rocket powered aircraft according to claim 17, wherein the nosecone tip, the inner and outer dome elements and the shim comprise titanium and the ring comprises:
an upper anvil titanium portion; and
a lower anvil titanium portion from which the upper anvil titanium portion is detachable.

19. The ballistic or rocket powered aircraft according to claim 18, wherein the inner dome element is welded to the upper anvil titanium portion.

20. The ballistic or rocket powered aircraft according to claim 18, further comprising:
fasteners by which the inner dome element is fastened to the lower anvil titanium portion; and
pressure relief doors arranged with the fasteners.

* * * * *